United States Patent [19]

Kobayashi

[11] Patent Number: 5,436,969
[45] Date of Patent: Jul. 25, 1995

[54] PORTABLE TELEPHONE SET COMBINED WITH A CARD

[75] Inventor: Fumiyuki Kobayashi, Tokyo, Japan
[73] Assignee: NEC Corporation, Tokyo, Japan
[21] Appl. No.: 210,025
[22] Filed: Mar. 18, 1994

[30] Foreign Application Priority Data

Mar. 19, 1993 [JP] Japan .................. 5-059884

[51] Int. Cl.⁶ ............................................ H04M 1/00
[52] U.S. Cl. .................................. 379/433; 379/434; 379/428
[58] Field of Search ............... 379/433, 434, 428, 429; 455/89, 90, 185.1

[56] References Cited

U.S. PATENT DOCUMENTS 5,257,414 10/1993 Trahan et al. .............. 455/185.1

FOREIGN PATENT DOCUMENTS 276403 8/1988 European Pat. Off. .
281728 9/1988 European Pat. Off. .
2587549 9/1985 France .................. 379/428
3738389 5/1989 Germany .
4-48309 8/1992 Japan .

*Primary Examiner*—James L. Dwyer
*Assistant Examiner*—Jack Chiang
*Attorney, Agent, or Firm*—Ostrolenk, Faber, Gerb & Soffen

[57] ABSTRACT

In a portable telephone set for use in combination with an IC card comprising an IC unit mounted thereon and a contact connected to the IC unit, the portable telephone set comprises a telephone body, the telephone body comprises a battery unit receiving portion, first and second holding portions formed on the battery unit receiving portion for holding the card, and a connector mounted on the battery unit receiving portion. The portable telephone set further comprises a battery unit which is removably attached to the battery unit receiving portion. The IC card is attached to the battery unit receiving portion and is sandwiched between the battery unit receiving portion and the battery unit so that the contact is connected to the connector.

5 Claims, 5 Drawing Sheets

PORTABLE TELEPHONE SET COMBINED WITH A CARD

BACKGROUND OF THE INVENTION

This invention relates to a portable telephone set for use in combination with a card which is preliminarily assigned a telephone number.

In Europe, such a portable telephone set is widely used as a GSM type portable telephone set for an automobile. The portable telephone set of the type is disclosed in Japanese Patent Publication No. 48309/1992 (Tokko Hei 4-48309) and is combined with an IC card which is called an SIM card. Namely, the IC card is removably attached to the portable telephone set. The IC card is preliminarily assigned an identification number, for example, a telephone number and comprises an IC unit comprising a memory. The telephone number is preliminarily stored in the memory. The portable telephone set is supplied with the telephone number from the IC card. This means that the portable telephone set can use only when the IC card is attached to the portable telephone set. In other words, the portable telephone set is sharable by a plurality of possessors having different IC cards which are assigned the different telephone numbers. In this event, telephone charges of the respective possessors are individually counted in accordance with the respective telephone numbers.

In the meantime, the IC card is generally attached to the portable telephone set by insertion method. In the insertion method, the portable telephone set has a card storage portion in which the whole of the IC card can be held. In this event, the portable telephone set requires an eject mechanism for ejecting the IC card from the card storage portion. This means that the portable telephone set becomes complicate in inner structure and therefore becomes large in size and expensive.

SUMMARY OF THE INVENTION

It is therefore an object of this invention to provide a portable telephone set wherein an IC card can be attached thereto in simple structure.

It is another object of this invention to provide the above portable telephone set wherein the IC card is removable therefrom without a complicate mechanism, such as an eject mechanism.

It is still another object of this invention to provide the above portable telephone set which can be realized by low cost and without increase of size.

Other objects of this invention will become clear as the description proceeds.

On describing the gist of this invention, it is possible to understand that a portable telephone set is for use in combination with a card comprising first and second side ends opposite to each other, an IC unit mounted thereon, and a contact connected to said IC unit.

According to this invention, the portable telephone set comprises a telephone body comprising a battery unit receiving portion, first and second holding portions formed on the battery unit receiving portion for holding the card at the first and the second side ends, and a connector mounted on the battery unit receiving portion; and a battery unit which is removably attached to the battery unit receiving portion. The card is attached to the battery unit receiving portion and is sandwiched between the battery unit receiving portion and the battery unit so that the contact is connected to the connector.

DESCRIPTION OF THE PREFERRED EMBODIMENT

Referring to FIGS. 1 to 4, several kinds of conventional portable telephone sets will be described at first in order to facilitate an understanding of the present invention. The portable telephone sets are of the type referred to in the background of the invention.

Figure 1:
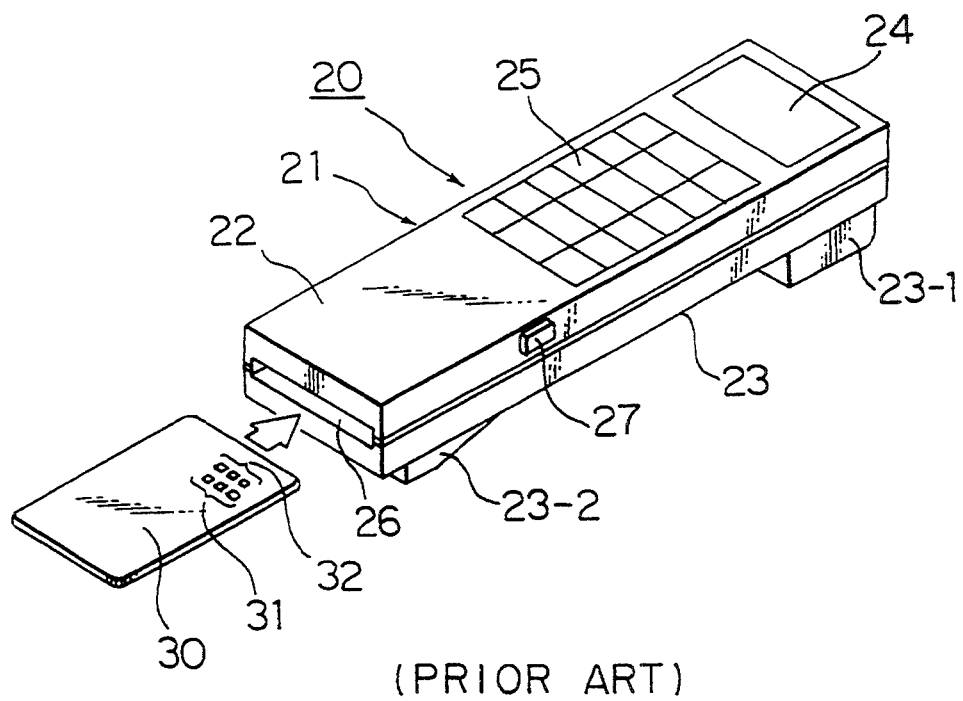
FIG. 1 is a perspective illustration of a first example of a conventional portable telephone set.

In FIG. 1, the portable telephone set 20 comprises a telephone body 21 including a circuit arrangement (not shown) which comprises receiving and transmitting circuits. The portable telephone set 20 further comprises an antenna rod (not shown) connected to the receiving and the transmitting circuits. The telephone body 21 comprises upper and under surfaces 22 and 23. The upper surface 22 is substantially planar. The telephone body 21 further comprises a display panel 24 arranged on the upper surface 22 and input keys 25 comprising dial keys and function keys which are arranged on the upper surface 22. The under surface 23 has a first swell portion 23-1 containing a speaker (not shown) connected to the receiving circuit and a second swell portion 23-2 containing a microphone (not shown) connected to the transmitting circuit.

The telephone body 21 has a receiving slot 26 formed through a side end surface thereof. The receiving slot 26 is for receiving the whole of an IC card depicted at 30. The telephone body 21 still further comprises a connector (not shown) connected to the circuit arrangement and mounted on an inner surface of the receiving slot 26 at the back portion of the receiving slot 26.

The IC card 30 is assigned a predetermined telephone number and comprises an IC unit symbolically depicted at 31 and contacts 32 connected to the IC unit 31, all of which are mounted on an upper surface thereof. The IC unit 31 comprises a memory (not shown) in which the predetermined telephone number is preliminarily stored. When the IC card 30 is inserted in the receiving slot 26, the contacts 32 are connected to the connector in the telephone body 21. Thus, the predetermined telephone number is read out of the memory and is supplied to the circuit arrangement.

The telephone body 21 comprises an eject mechanism (not shown) for ejecting the IC card 30 from the receiving slot 26. The eject mechanism is well known in the art and comprises an eject button 27 attached to a side surface of the telephone body 21. When the eject button 27 is pressed, the eject mechanism ejects the IC card 30 from the receiving slot 26.

As apparent from the above description, the portable telephone set 20 requires the eject mechanism and the eject button 27.

Figure 2:
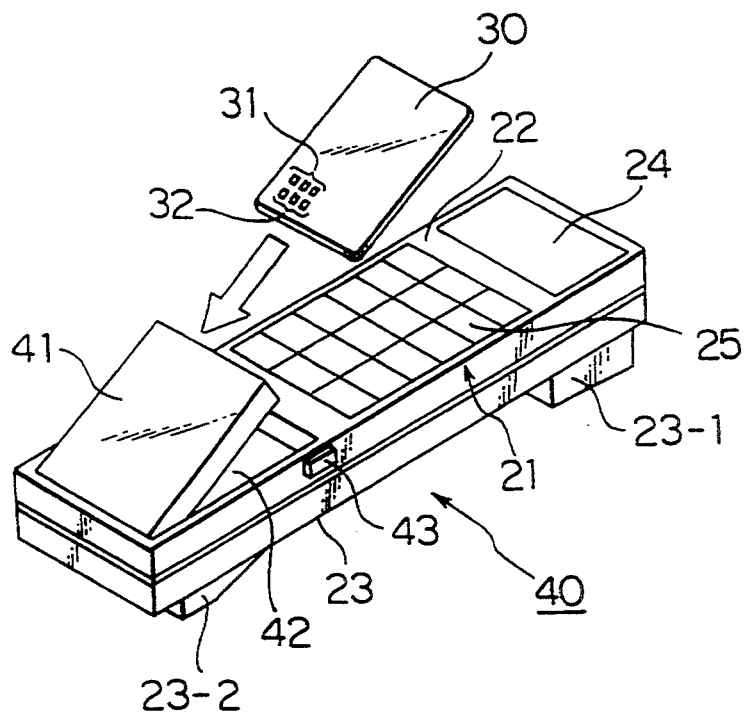
FIG. 2 is a perspective illustration of a second example of a conventional portable telephone set.

In FIG. 2, a portable telephone set 40 comprises similar parts designated by like reference numerals except that a card receiving case 41 is used in place of the receiving slot 26 illustrated in FIG. 1. The card receiving case 41 has an insertion hole for receiving the most of the IC card 30. A connector to be connected to the contacts 32 is mounted on an inner surface of the insertion hole at the back portion thereof. The connector is connected to the circuit arrangement in the telephone body 21.

The telephone body 21 has a case receiving portion 42 formed on the upper surface 22. The case receiving portion 42 is for receiving the card receiving case 41. The card receiving case 41 is rotatably attached to the case receiving portion 42. The card receiving case 41 is rotatable by a predetermined rotation angle as illustrated in FIG. 2. The telephone body 21 comprises a holding mechanism for holding the card receiving case 41 in the case receiving portion 42, a releasing mechanism for releasing the card receiving case 41 from the case receiving portion 42, and a push button 43 attached to the side surface of the telephone body 21. When the push button 43 is pressed, the release mechanism releases the card receiving case 41 from the case receiving portion 42.

As apparent from the above description, the portable telephone set 40 requires the holding mechanism, the releasing mechanism, and the push button 43.

Figure 3:
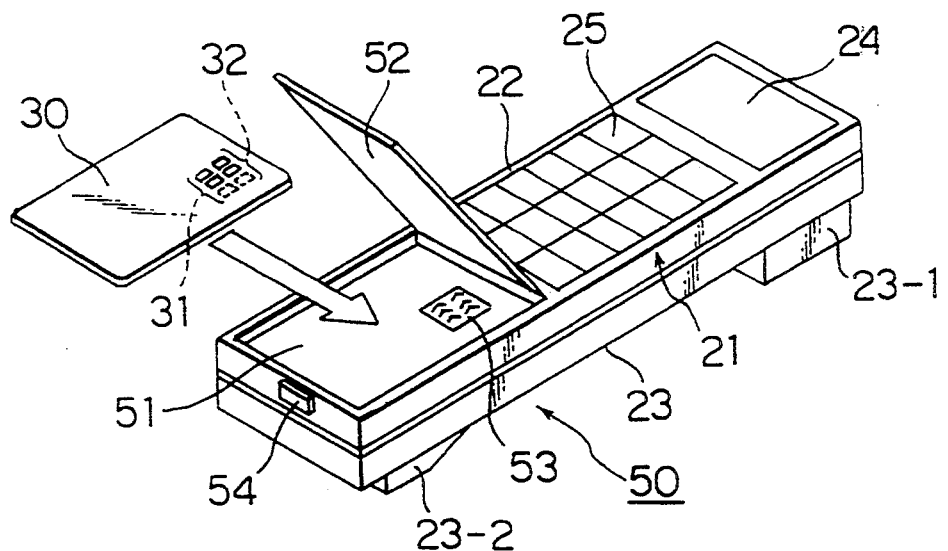
FIG. 3 is a perspective illustration of a third example of a conventional portable telephone set.

Turning to FIG. 3, a portable telephone set 50 comprises similar parts designated by like reference numerals except that a card receiving portion 51 is formed on the upper surface 22 in place of the receiving slot 26 illustrated in FIG. 1. The card receiving portion 51 is covered by a cover plate 52 which is rotatably attached to the card receiving portion 51. A connector 53 to be connected to the contacts 32 is mounted on the card receiving portion 51 and is connected to the circuit arrangement in the telephone body 21.

The telephone body 21 comprises a holding mechanism for holding the cover plate 52 in a state of covering the card receiving portion 51, a releasing mechanism for releasing the cover plate 52 from a holding state, and a release button 54 attached to the side end surface of the telephone body 21. The card receiving portion 51 is covered by the cover plate 52 after attachment of the IC card 30. When the release button 54 is pressed, the release mechanism releases the cover plate 52 from the holding state. At any rate, the portable telephone set 50 requires the holding mechanism, the releasing mechanism, and the release button 54.

Figure 4:
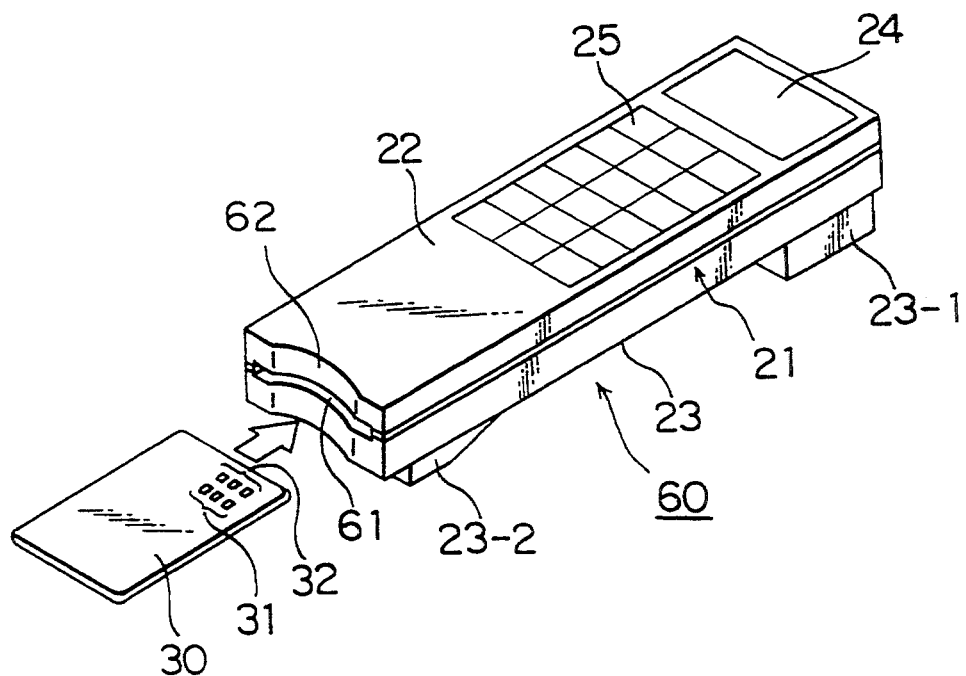
FIG. 4 is a perspective illustration of a fourth example of a conventional portable telephone set.

In FIG. 4, a portable telephone set 60 comprises similar parts designated by like reference numerals except that a card receiving slot 61 is used in place of the receiving slot 26 illustrated in FIG. 1. The card receiving slot 61 is formed through the side end surface of the telephone body 21 and receives most of the IC card 30. A connector to be connected to the contacts 32 is mounted on an inner surface of the card receiving slot 61 at the back portion thereof. The connector is connected to the circuit arrangement in the telephone body 21.

It should be noted here that the side end surface of the telephone body 21 has a curved portion 62. This means that a part of the IC card 30 protrudes from the curved portion 62. Possessor can pick the part of the IC card 30 protruded from the curved portion 62 and therefore can pull the IC card 30 out of the card receiving slot 61 without the eject or the release mechanism mentioned in conjunction with FIG. 1 or FIG. 2. However, there is a possibility that a flaw occurs in the IC card 30 because the part of the IC card 30 exposes to outside the telephone body 21.

Referring to FIGS. 5 to 10, the description will proceed to a portable telephone set according to a preferred embodiment of this invention.

Figure 5:
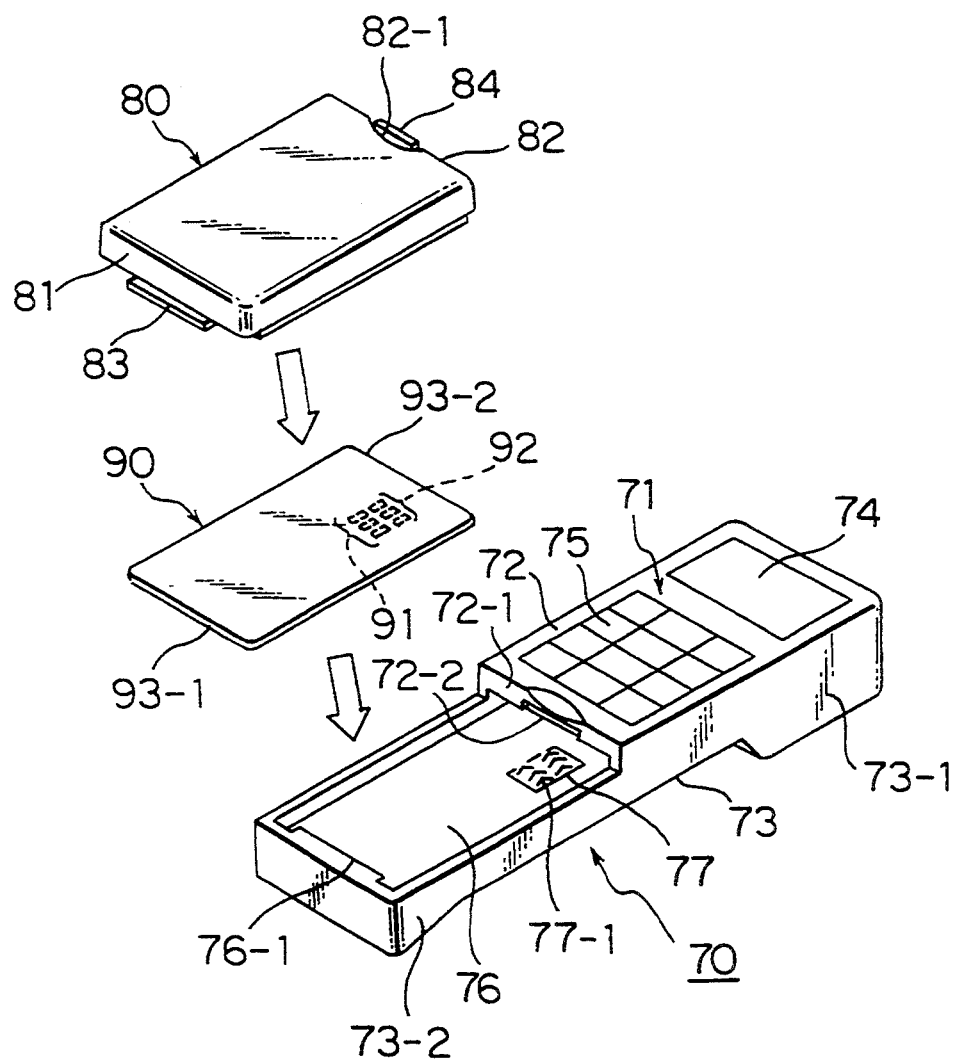
FIG. 5 is a perspective illustration of a portable telephone set according to a preferred embodiment of this invention.

In FIG. 5, the portable telephone set 70 comprises a telephone body 71 including a circuit arrangement (not shown) which comprises receiving and transmitting circuits. The portable telephone set 70 further comprises an antenna rod (not shown) connected to the receiving and the transmitting circuits. The portable telephone set 70 still further comprises a battery unit 80 including a battery (not shown) and an IC card 90 similar to that descried in conjunction with FIG. 1.

The telephone body 71 has upper and under surfaces 72 and 73 and an end surface 72-1 substantially perpendicular to the upper surface 72. A recessed portion 72-2 is formed through the end surface 72-1. The telephone body 71 further comprises a display panel 74 arranged on the upper surface 72 and input keys 75 comprising dial keys and function keys which are arranged on the upper surface 72. The under surface 73 has a first swell portion 73-1 containing a speaker (not shown) connected to the receiving circuit and a second swell portion 73-2 containing a microphone (not shown) connected to the transmitting circuit. The telephone body 71 has a battery unit receiving portion 76 for receiving the battery unit 80. As will later become clear, the battery receiving portion 76 serves as a receiving portion for receiving the IC card 90. Namely, the IC card 90 is attached to the telephone body 71 in a state that the IC card 90 is sandwiched between the battery receiving portion 76 and the battery unit 80. Under the circumstances, the battery receiving portion 76 has an area slightly wider than that of the IC card 90. The telephone body 71 still further comprises a connector 77 mounted on the battery receiving portion 76 and connected to the circuit arrangement. The connector 77 comprises a roof-shaped blade spring 77-1 which serves as a contact.

As mentioned in conjunction with FIG. 1, the IC card 90 is assigned a predetermined telephone number and comprises an IC unit symbolically depicted at 91, contacts 92 connected to the IC unit 91, and first and second side ends 93-1 and 93-2 opposite to each other. The IC unit 91 comprises a memory (not shown) in which the predetermined telephone number is preliminarily stored. It should be noted here that the IC card 90 is turned upside down. In other words, the IC card 90 is illustrated in the state that the upper surface thereof directs downward.

Figure 6:
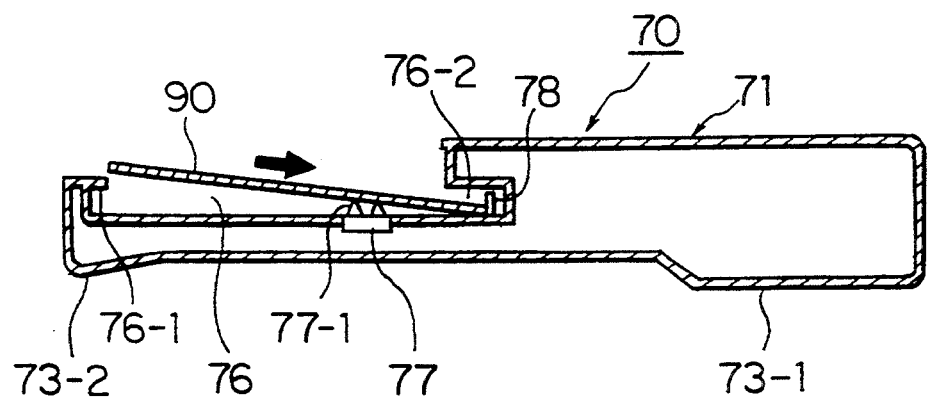
FIG. 6 is a vertical sectional view for describing attachment method of an IC card in the portable telephone set illustrated in FIG. 5.
Figure 7:
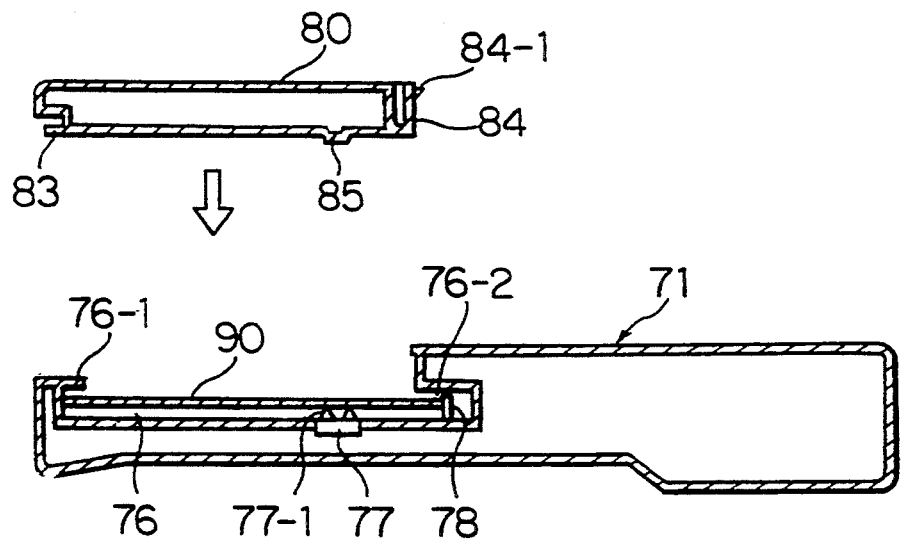
FIG. 7 is a vertical sectional view for describing attachment method of a battery unit in the portable telephone set illustrated in FIG. 5.

In FIGS. 5 and 6, the battery unit receiving portion 76 has a projection portion 76-1 at a side end thereof and has a slot portion 76-2 at another side end opposite to the side end. The projection portion 76-1 and the slot portion 76-2 are for holding the IC card 90 at the first and the second side ends 93-1 and 93-2, respectively. The projection portion 76-1 and the slot portion 76-2 may therefore be called holding portions. As will later be described, the projection portion 76-1 serves as a holding portion for holding the battery unit 80 at a side end thereof. In the slot portion 76-2, a wire spring 78 is attached to the telephone body 71 so as to upwardly protrude from a bottom surface of the battery unit receiving portion 76. When the second side end 93-2 of the IC card 90 is inserted into the slot portion 76 against the spring wire 78, the spring wire 78 generates stress in a direction which puts back the IC card 90. In this state, it is possible to insert the first side end 93-1 of the IC card 90 into space or a slot between the projection portion 76-1 and the bottom surface of the battery receiving portion 76 as illustrated in FIG. 7. Thus, the IC card 90 is attached to the battery receiving portion 76. In this state, it should be noted here that the contacts 92 are connected to the connector 77.

In FIGS. 5 and 7, the battery unit 80 has first and second side end surfaces 81 and 82 and an area equal to that of the battery unit receiving portion 76. The second side end surface 82 has a recessed portion 82-1. The battery unit 80 comprises a projection portion 83 formed under the first side end surface 81 and a bracket plate 84 formed at the recessed portion 82-1. The bracket plate 84 has elasticity and has a projection 84-1 formed on an outer surface thereof. The battery unit 80 further comprises a protrusion 85 formed on the under surface thereof at a position which corresponds to the connector 77. The battery unit 80 still further comprises a pair of source terminals (not shown) attached to the second side end surface 82. The pair of source terminals are connected to the battery included in the battery unit 80. In this event, in order to connect the pair of source terminals with the circuit arrangement included in the telephone body 21, a pair of reception terminals (not shown) are attached to the end surface 72-1 and are connected to the circuit arrangement. The battery unit 80 is attached to the telephone body 71 in the following manner.

Figure 8:
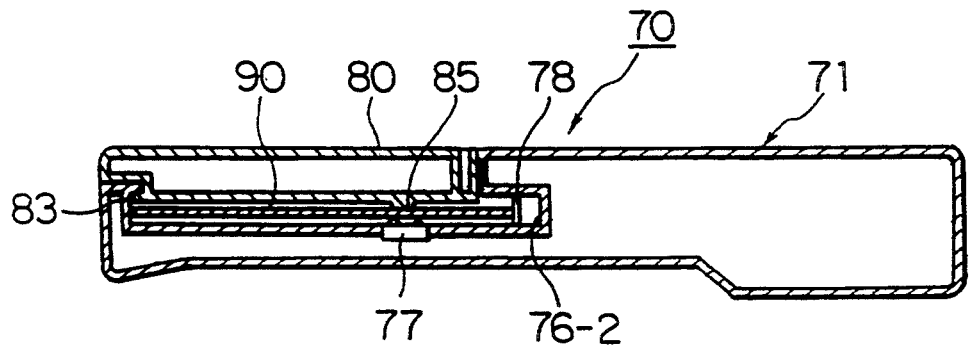
FIG. 8 is a vertical sectional view of the portable telephone set illustrated in FIG. 5.
Figure 10:
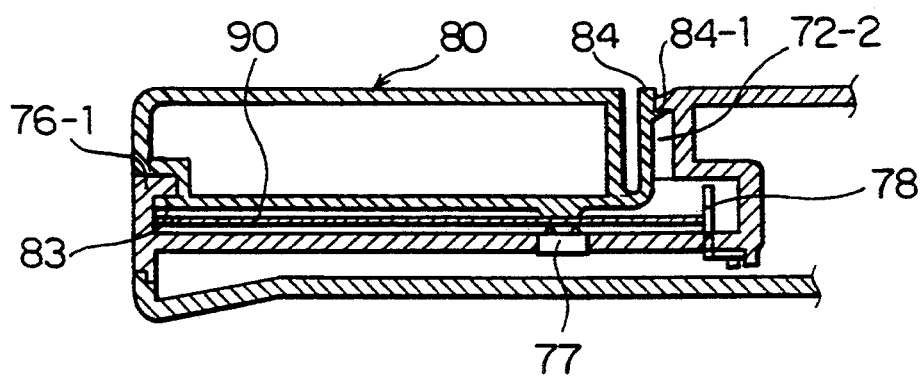
FIG. 10 is a partial enlarged vertical sectional view for describing attachment structure among the telephone body, the IC card, and the battery unit which are illustrated in FIG. 5.

At first, the projection portion 83 is engaged with an under side of the projection portion 76-1. As a result, the projection portion 76-1 is inserted into space between the projection portion 83 and the under surface of the battery unit 80. Next, the bracket plate 84 is engaged with the end surface 72-1 so that the projection 84-1 is inserted into the recessed portion 72-2. Thus, the battery unit 80 is attached to the telephone body 71 as illustrated in FIGS. 8 and 10. It should be noted here that the IC card 90 is sandwiched between the battery unit receiving portion 76 and the battery unit 80 so that the protrusion 85 presses the IC card 90. This means that the IC card 90 is perfectly covered by the telephone body 71 and the battery unit 90 and that the contacts 92 (FIG. 5) surely contact with the connector 77.

The IC card 90 is removed from the telephone body 71 in the following manner. At first, the battery case 80 is removed from the telephone body 71. Next, the IC card 90 is pushed against the spring wire 78. In this state, the first side end 93-1 of the IC card 90 can be released from the projection portion 76-1 as shown in FIG. 6. As a result, the IC card 90 is removed from the battery receiving portion 76.

Figure 9:
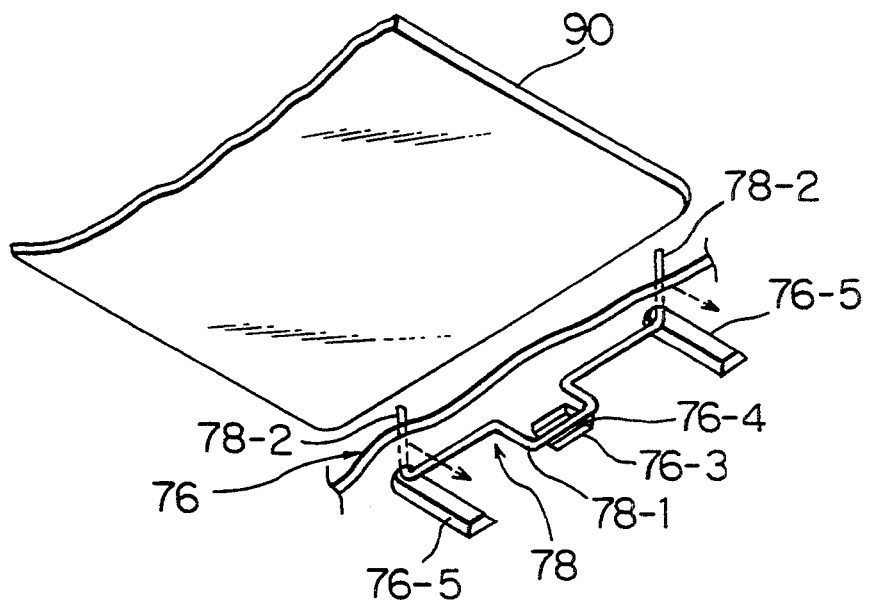
FIG. 9 is a partial perspective illustration for describing a wire spring illustrated in FIG. 5.

Referring to FIG. 9, the wire spring 78 is attached to an under surface of the battery receiving portion 76. The wire spring 78 comprises an U-shaped portion 78-1 formed in the middle thereof and upright portions 78-2 formed at both ends thereof. A projection block 76-3 having a groove 76-4 is formed on the under surface of the battery receiving portion 76. The battery receiving portion 76 has a pair of slits 76-5 which extend parallel to an insertion direction depicted by a real arrow line.

In this structure, the U-shaped portion 78-1 is closely fitted in the groove 76-4 of the projection block 76-3 in the state that the upright portions 78-2 upwardly extend from the bottom surface of the battery receiving portion 76 through the slits 76-5. Thus, the spring wire 78 is held by the projection block 76-3 without a fall from the under surface of the battery receiving portion 76. Furthermore, the upright portions 78-2 are transformable in a direction depicted by a dotted arrow line. When the upright portions 78-2 are transformed by the IC card 90, the upright portions 78-2 generate the stress in the direction which put back the IC card 90.

In addition, the U-shaped portion 78-1 may be replaced by a straight portion. Moreover, the spring wire 78 may be placed under the projection portion 76-1. The spring wire 78 may be implemented by another spring member, such as a blade spring.

Figure 11:
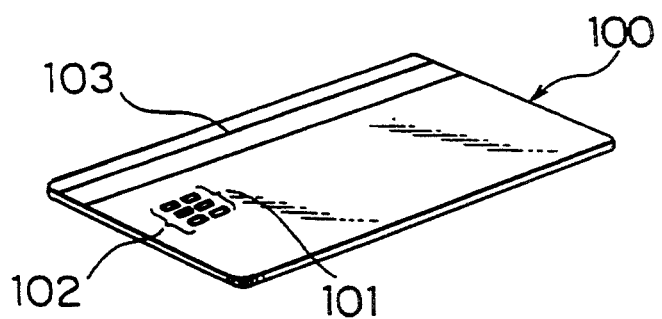
FIG. 11 is a perspective view of another type of IC card which is combined with the telephone body illustrated in FIG. 5.

Referring to FIG. 11, this invention is applicable to an IC card 100 which comprises an IC unit 101, contacts 102, and a magnetic film 103 formed in the manner known in the art.

While this invention has thus far been described in conjunction with a preferred embodiment thereof, it will readily be possible for those skilled in the art to put this invention into practice in various other manners.

What is claimed is:

1. A portable telephone set for use in combination with a card comprising first and second side ends opposite to each other, an IC unit mounted thereon, and a contact connected to said IC unit, said portable telephone set comprising:

a telephone body comprising a battery unit receiving portion, first and second holding portions formed on said battery unit receiving portion for holding said card at said first and said second side ends, and a connector mounted on said battery unit receiving portion; and a battery unit which is removably attached to said body and disposed at said battery unit receiving portion;

said card being attached to said battery unit receiving portion and being sandwiched between said battery unit receiving portion and said battery unit so that said contact is connected to said connector;

said battery unit having a protrusion at a position corresponding to said connector, said protrusion pressing said card to bring said contact into contact with said connector when said battery unit is attached to said body and disposed at said battery unit receiving portion.

2. A portable telephone set as claimed in claim 1, wherein said telephone body further comprises spring means attached to said battery unit receiving portion in position adjoining one of the first and the second holding portions for extruding said card in a direction which is released from said one of the first and the second holding portions, said direction being generally parallel to a plane in which said card is disposed when held by said first and second holding portions.

3. A portable telephone set as claimed in claim 2, wherein said spring means is comprises a wire spring, said wire spring being attached to said battery unit receiving portion in position adjoining said one of the first and the second holding portions so that said one of the first and the second side ends perpendicularly comes into contact with said wire spring.

4. A portable telephone set as claimed in claim 1, wherein said connector comprises a blade spring for pressing said card in a direction which is released from said battery unit receiving portion.

5. A portable telephone set as claimed in claim 1, wherein each of said first and said second holding portions is a slot formed on said telephone body.

* * * * *